United States Patent [19]

Hamano et al.

[11] Patent Number: 4,500,794
[45] Date of Patent: Feb. 19, 1985

[54] APPARATUS FOR AUTOMATICALLY STARTING AND STOPPING ENGINE

[75] Inventors: Isao Hamano; Akira Morishita; Yoshifumi Akae; Toshinori Tanaka, all of Himeji, Japan

[73] Assignee: Mitsubishi Denki Kabushiki Kaisha, Tokyo, Japan

[21] Appl. No.: 555,679

[22] Filed: Nov. 28, 1983

[30] Foreign Application Priority Data

Dec. 2, 1982 [JP] Japan ............................ 57-183862[U]
Dec. 2, 1982 [JP] Japan ............................ 57-183863[U]
Dec. 2, 1982 [JP] Japan ............................ 57-183864

[51] Int. Cl.³ .................................................. H02P 9/04
[52] U.S. Cl. .................................. 290/38 C; 290/37 R; 290/38 D; 123/146.5 D; 123/179 B
[58] Field of Search ............... 290/37 R, 38 C, 38 D, 290/38 E, 38; 123/146.5 D, 179 B, 179 BG, 198 DC; 180/280, 281, 282, 283, 287; 192/0.062; 318/139

[56] References Cited

U.S. PATENT DOCUMENTS

| | | | |
|---|---|---|---|
| 3,151,249 | 9/1964 | Ives | 123/179 BG X |
| 3,593,697 | 7/1971 | Ciolli et al. | 123/179 BG |
| 3,731,108 | 5/1973 | Kobara et al. | 290/37 X |
| 3,872,316 | 3/1975 | Kurii et al. | 290/38 |
| 3,941,204 | 3/1976 | Kurii et al. | 123/179 B X |
| 3,942,024 | 10/1976 | Ingham | 290/38 R |
| 3,949,236 | 4/1976 | Kurii et al. | 290/38 R |
| 4,062,419 | 12/1977 | Kadota | 290/38 E X |
| 4,198,945 | 12/1977 | Eyermann et al. | 123/179 B |
| 4,286,683 | 9/1981 | Zeigner et al. | 123/179 B |
| 4,371,051 | 2/1983 | Achterholt | 123/198 DB X |
| 4,372,262 | 2/1983 | Kaniut | 123/179 BG X |
| 4,402,286 | 9/1983 | Pagel et al. | 123/179 B |

FOREIGN PATENT DOCUMENTS

| | | | |
|---|---|---|---|
| 2736185 | 2/1979 | Fed. Rep. of Germany | 290/38 R |
| 28589 | 2/1983 | Japan | 290/38 R |
| 18558 | 2/1983 | Japan | 290/38 R |
| 18557 | 2/1983 | Japan | 290/38 R |

Primary Examiner—J. V. Truhe
Assistant Examiner—Paul Shik Luen Ip
Attorney, Agent, or Firm—Wenderoth, Lind & Ponack

[57] ABSTRACT

This invention relates to an apparatus for automatically starting and stopping an engine comprising a clutch switch for detecting that the depression of a clutch pedal of a vehicle is completely performed, a neutral switch for detecting the neutral position of a transmission, a vehicle speed sensor for generating a travel signal by detecting the travel of the vehicle, condition detecting means for detecting the operation maintaining condition of the engine, and control means for automatically stopping the engine by interrupting the energization of an ignition circuit when receiving a detection signal of the neutral switch and not receiving the detection signals of the vehicle speed sensor and the condition detecting means and automatically starting the engine by energizing the ignition circuit and a starter when receiving a detection signal of the clutch switch and not receiving the detection signals of the neutral switch, said vehicle speed sensor and the condition detecting means.

3 Claims, 5 Drawing Figures

APPARATUS FOR AUTOMATICALLY STARTING AND STOPPING ENGINE

BACKGROUND OF THE INVENTION

This invention relates to an apparatus for automatically starting and stopping an engine by automatically stopping the engine when a vehicle stops at an intersection to wait a signal so as to save the fuel consumption of the engine.

A conventional apparatus of this type is disclosed in Japanese Utility Model Publication No. 19,317/1978 official gazette, and its circuit arrangement is shown in FIG. 1. In the figure, numeral 1 designates a battery carried on a vehicle as a power source. Numeral 2 designates a key switch which connects a battery terminal 2B to an ignition terminal 2A or a starter terminal 2C to supply a power source voltage. Numeral 3 designates an ignition circuit of an engine having ignition coils 3L. Numeral 4 designates a normally open start switch. Numerals 5 and 6 designate the coil and the self-holding contacts of a self-holding relay, and when the coil 5 is energized, the closure between terminals 6a and 6b is switched to the closure between terminals 6a and 6c, a voltage of the ignition terminal 2A is applied through the terminals 6a and 6c and a normally closed cancel switch 7 to the coil 5, and the contact 6 is self-held by the coil 5. Numeral 8 denotes a starter for starting the engine. Numeral 9 denotes an ignition energization control circuit, which is energized by the self-holding of the contact 6 to control the energization of the ignition circuit 3 through a relay 9L. Numeral 10 indicates a starter energization control circuit, which controls the energization of the starter 8 through a relay 10L when the contact 6 is self-held. Numeral 11 indicates a lighting switch closed in response to the lighting of a headlight for applying a positive voltage applied to a terminal 11a to the ignition energization control circuit 9, numeral 12 indicates a reverse switch closed when a vehicle moves backwards for transmitting a positive voltage applied to a terminal 12a to the ignition energization control circuit 9, and numeral 13 indicates a normally closed water temperature sensor which opens when the water temperature of an engine coolant becomes a high temperature to overheat to interrupt the grounded state. Numeral 14 designates a turn signal switch which closes when the vehicles turns to the right to transmit a positive voltage applied to a terminal 14a to the ignition energization control circuit 9, numeral 15 designates a vehicle speed sensor which intermittently generates a travel signal by a rotating permanent magnet (not shown) fixed to an axle when the vehicle travels, and numeral 16 designates an accelerator switch which closes when an accelerator pedal is depressed to become a grounded state. Numeral 17 indicates a first clutch switch which opens when a clutch is completely engaged and closes when the clutch pedal is depressed to collapse the completely engaged state to become a grounded state, thereby generating a depression detection signal of a first detection signal, numeral 18 indicates a slope switch which detects a slope when the vehicle arrives at the slope to close and becomes a grounded state, and numeral 19 indicates a second clutch switch which closes when the clutch pedal is fully depressed so that the clutch is completely isolated to become a grounded state, and generates an isolation detection signal of a second detection signal. Numeral 20 denotes an engine start detecting circuit which detects the voltage generated from an alternator 20a produced by the rotation of the engine to indirectly detect the start of the engine, and interrupts the starter energization control circuit 10 to interrupt the energization of the starter 8. Numerals $9D_1$–$9D_6$ designate diodes, numerals $9R_1$–$9R_6$ designate resistors, numerals $9C_1$, $9C_2$ designate capacitors, numerals $9Tr_1$–$9Tr_4$ designates transistors, numerals $10Tr_1$, $10Tr_2$ designate transistors, and numerals $20Tr_1$, $20T_2$ designate transistors.

The prior-art apparatus operates as described below. In order to initially operate the device, the key switch 2 is closed to close the start switch 4. Thus, the coil 5 is energized through the key switch 2 and the start switch 4 from the battery 1, the terminals 6a and 6c of the contact 6 are closed and self-held, and the circuits 9, 10, 20 are energized. When the engine is started at this time so that the vehicle travels, the vehicle speed sensor 15 operates to become ON and OFF, a positive voltage is charged at the condensor $9C_2$, the transistor $9Tr_2$ is thus conducted, while the transistor $9Tr_3$ is interrupted, and the output transistor $9Tr_4$ is conducted. Thus, the ignition energization relay 9L is energized to close its contacts, thereby supplying a current to the ignition circuit 3 from the battery and allowing the engine to continuously operate.

The operation of the apparatus when the vehicle thereafter stops will be described. When the vehicle now stops, the vehicle speed sensor 15 stops generating the travel signal. The clutch pedal 22 is disposed at the position 22b in FIG. 2 in the state that the clutch pedal is not yet released at this time, the clutch switches 17 and 19 are closed to allow the transistor $9Tr_1$ to be interrupted. Thus, the capacitor $9C_2$ is charged, the transistor $9Tr_4$ is thus conducted to energize the relay 9L to close its contacts, thereby energizing the ignition circuit 3 from the battery, and the engine is not stopped. When a foot 21 is thereafter isolated from the clutch pedal 22 while the vehicle remains stopping and the clutch pedal 22 is moved to the position designated by a solid line in FIG. 2, the clutch switches 17 and 19 are opened, and when the accelerator switch 16 and the slope switch 18 are opened, the transistor $9Tr_1$ is conducted. When the turn signal switch 14 is further opened, the condenser $9C_2$ becomes zero volt, and the transistor $9Tr_3$ is conducted. When the lighting switch 11 and the reverse switch 12 are opened in this state and the water temperature sensor 13 is closed, the transistor $9Tr_4$ is interrupted, the relay 9L is deenergized to open its contacts, thereby interrupting the energization of the ignition circuit 3 from the battery and stopping the engine.

The engine should not be automatically stopped when the slope switch 18 is closed, the turn signal switch 14 is closed, the reverse switch 12 is closed, the lighting switch 11 is closed and the water temperature sensor 13 is opened. In all cases, the transistor $9Tr_4$ is conducted, and the engine is not stopped.

The automatically starting operation of the engine will be then described. When the vehicle is now stopped so that the engine is stopped, the alternator 20a does not generate, the transistor $20Tr_1$ is interrupted while the transistor $20Tr_2$ is conducted. Since the second clutch pedal 19 is released when the clutch pedal 12 is not depressed by the foot 21, a base current is supplied through a resistor 10R and a diode 10D to the transistor $10Tr_1$, and the transistor $10Tr_1$ is conducted, while the transistor $10Tr_2$ is interrupted, thereby deenergizing the relay 10L to open its contacts and thus interrupting the energization of the starter 8. When the clutch pedal 22 is depressed in this state, the pedal 22 is first moved to the position designated by broken line 22a to close the first clutch switch 17, thereby energizing the relay 9L to close its contacts and supplying a current to the ignition circuit 3 from the battery. When the clutch pedal 22 is then fully depressed so as to completely isolate the clutch, the second clutch switch 19 is closed to ground the base of the transistor 10Tr$_1$ through a diode 10D and to allow the transistor 10Tr$_1$ to be interrupted and the transistor 10Tr$_2$ to be conducted. Thus, the relay 10L is energized to close its contacts to energize the starter 8, and the engine is automatically started. In this manner, the alternator 20a generates to conduct the transistor 20Tr$_1$ while to interrupt the transistor 20Tr$_2$. Thus, the transistor 10Tr$_1$ is conducted, while the transistor 10Tr$_2$ is interrupted, thereby deenergizing the relay 10L to open its contacts. Thus, the starter 8 is stopped. In summary, the above-described operations of the apparatus are listed in Table 1 below.

TABLE 1

|  | Engine start | Engine stop |
| --- | --- | --- |
| First clutch switch 17 | ON to energize ignition circuit 3 | OFF |
| Second clutch switch 19 | On to energize starter 8 |  |

However, in the prior-art apparatus described above, it has such disadvantages that, when the clutch pedal 22 is depressed, the starter 9 is started even without occupant's intension of starting, and when the depression of the clutch pedal 22 is released without shifting a transmission to neutral position, an engine stop occurs, resulting in economical loss.

SUMMARY OF THE INVENTION

This invention has been made in view of the disadvantages described above, and has for its object to provide an apparatus for automatically starting and stopping an engine which is constructed to operate only when an intension of effectively stopping or starting a vehicle exists by considering an economical balance and hence the appropriate functional cost to eliminate economical loss.

DESCRIPTION OF THE PREFERRED EMBODIMENTS

Figure 2:
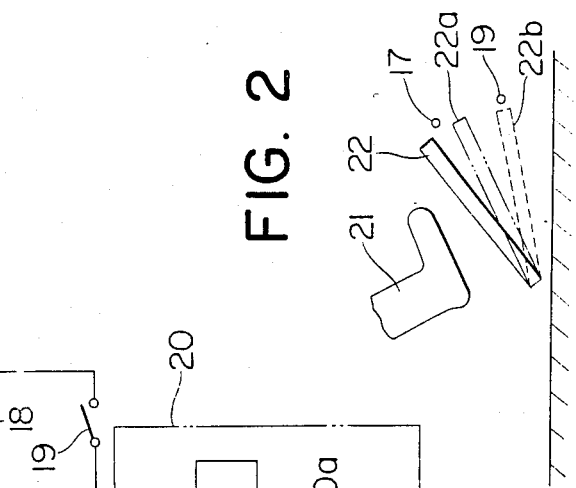
FIG. 2 is an explanatory view of the operation of a clutch section of the prior-art apparatus.
Figure 1:
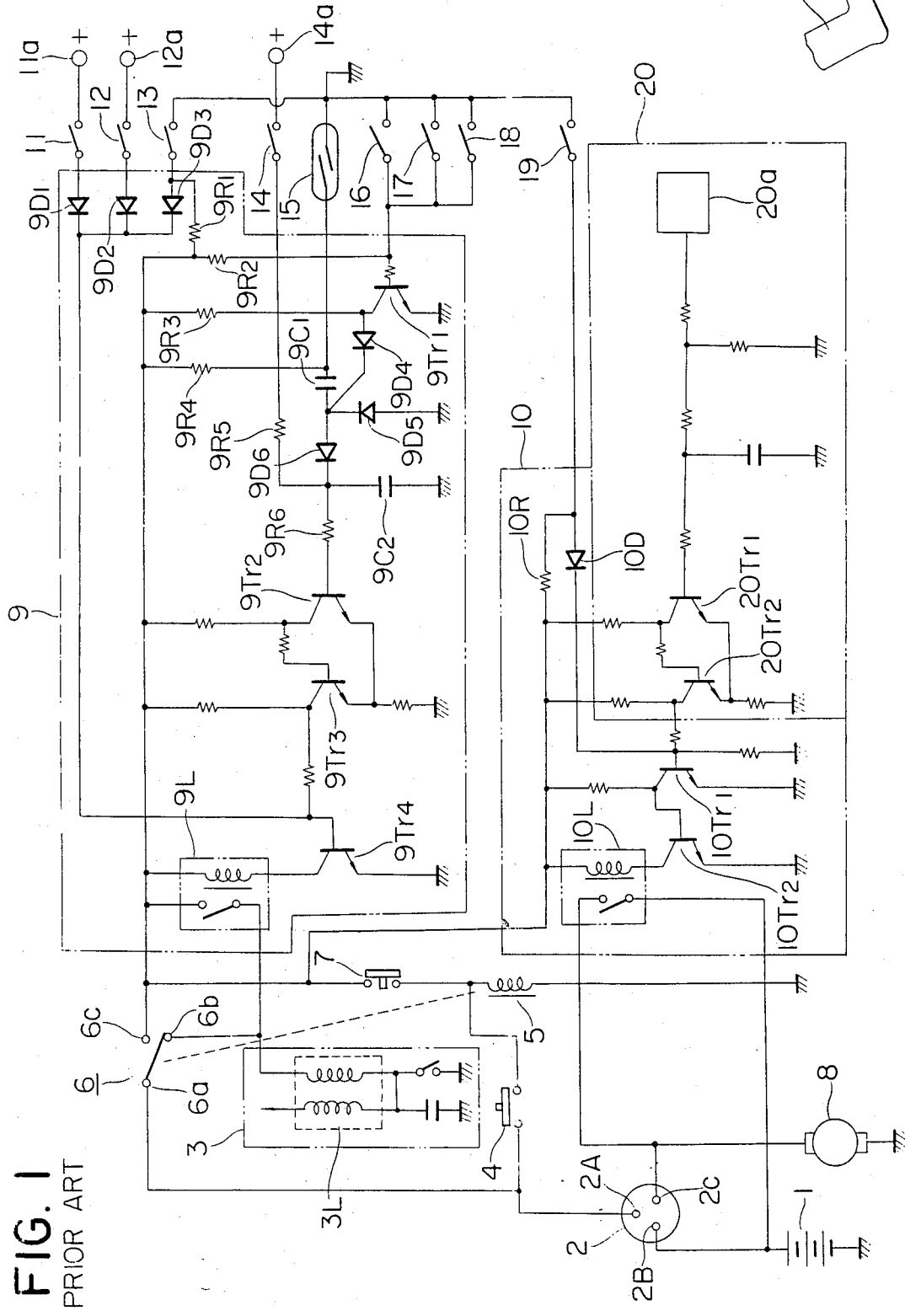
FIG. 1 is a circuit diagram of a prior-art apparatus.
Figure 3:
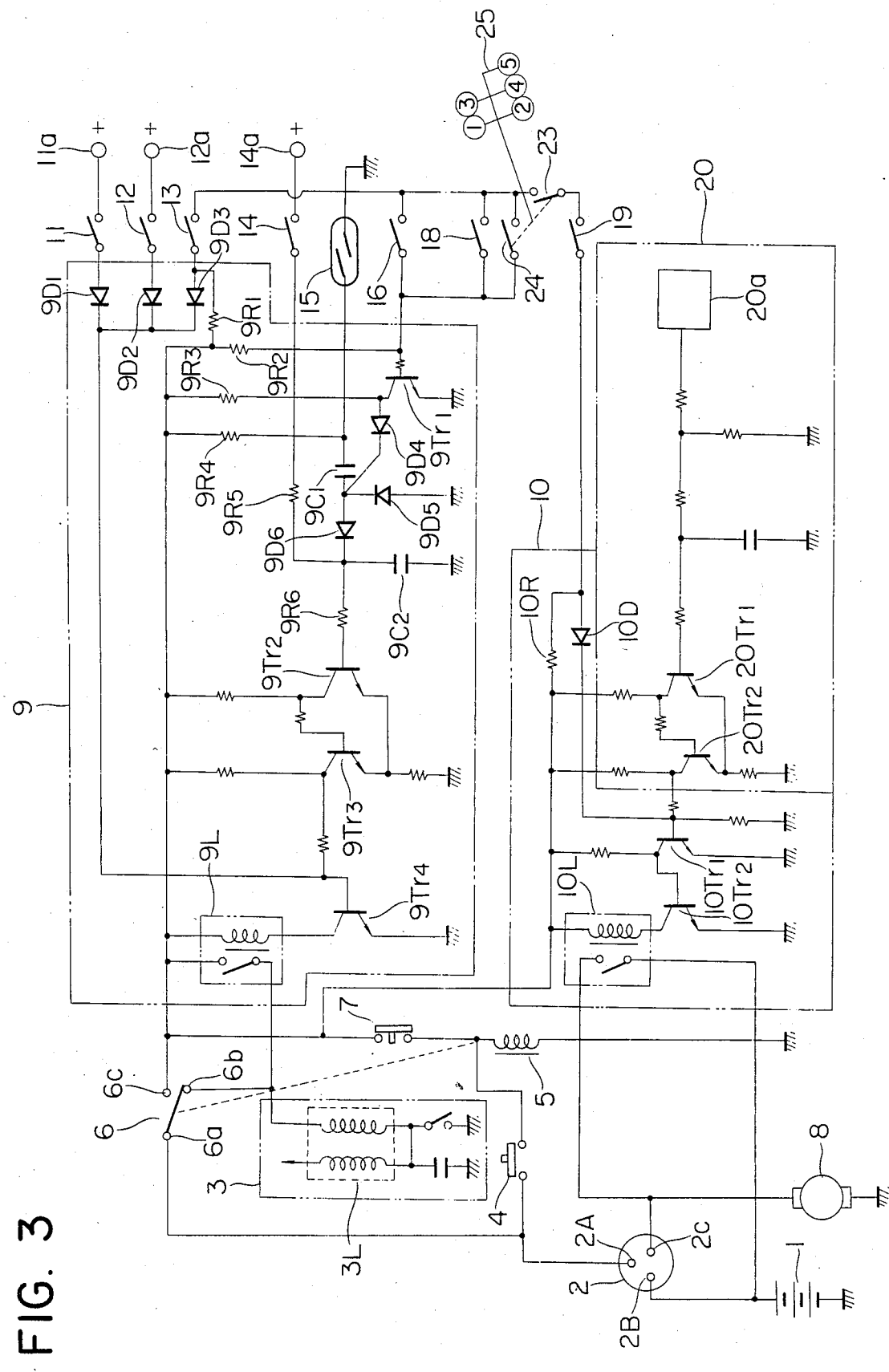
FIG. 3 is a circuit diagram of a first embodiment of an apparatus for automatically starting and stopping an engine according to the present invention.

A first embodiment of the present invention will now be described with reference to the accompanying drawings. In FIG. 3, numerals 23 and 24 designate neutral switches which interlock a the shift lever 25 of a transmission, and which open when the shift lever 25 is located at its neutral position. Other elements are equivalent to those shown in FIG. 1, and the corresponding parts are denoted by the same symbols, and will not be explained repeatedly.

In the above-described apparatus, when a vehicle stops and the shift lever 25 is set to the neutral position, the neutral switches 23 and 24 open, and when the accelerator switch 16 and the slope switch 18 are opened, the transistor 9Tr$_1$ is conducted. Further, when the turn signal switch 14 is opened, the voltage of the capacitor 9C$_2$ is zero volt, and the transistor 9Tr$_2$ is interrupted, while the transistor 9Tr$_3$ is conducted. When the lighting switch 11 and the reverse switch 12 are opened and the water temperature sensor 13 is closed in this state, the output transistor 9Tr$_4$ is interrupted, thereby deenergizing the ignition energization relay 9L to open its contacts and thus deenergizing the ignition circuit 3 of the engine to stop the engine.

On the other hand, when the clutch pedal 22 is fully depressed and the transmission is shifted to the position except the neutral position at the automatically starting time, the switches 19, 23 and 24 are closed. When the switch 24 is closed, the base voltage of the transistor 9Tr$_1$ becomes zero volt, thereby interrupting the transistor 9Tr$_1$. In this manner, a charging current is flowed through the capacitor 9C$_2$, resistor 9R$_3$ and diode 9D$_4$, 9D$_6$ to charge the capacitor 9C$_2$. Thus, the 9Tr$_2$ is conducted, while the transistor Tr$_3$ is interrupted, and the transistor 9Tr$_4$ is conducted, thereby energizing the relay 9L to close its contacts and thus supplying a current to the ignition circuit 3 from the battery as was described previously. Since the switches 19 and 23 are closed, the diode 10D is interrupted. Thus, the base current of the transistor 10Tr$_1$ is bypassed to the earth through the switches 19 and 23. Accordingly, the transistor 10Tr$_1$ is interrupted, while the transistor 10Tr$_2$ is conducted, thereby energizing the relay 10L to close its contacts and thus energizing the starter 8 to automatically start the engine.

The above operations of the apparatus is summarized in Table 2 below.

TABLE 2

| Engine | Transmission | Clutch | Vehicle speed |
| --- | --- | --- | --- |
| Stop | N |  | 0 (stop) |
| Start | except N | clutch switch 19 ON | 0 (stop) |

Where N designates the neutral position. The vehicle speed is zero in both cases and detected by the vehicle speed sensor 15. In case of automatic stop, the conditions that the slope switch 18, turn signal switch 14, accelerator switch 16, lighting switch 11 and reverse switch 12 are opened and the water temperature sensor 13 is closed are added as described above, and these conditions also become the conditions of automatic start. The reverse to these conditions become the engine operation maintaining conditions.

As set forth above, according to this invention, the automatic stop of the engine has the condition that the shifting position of the transmission is neutral, the automatic start of the engine has the conditions that the shifting position of the transmission is not neutral and that the clutch pedal is completely fully depressed. Thus, the occupant's stopping invention can be confirmed by the neutral position of the shifting position of the transmission, and the occupant's starting intention can be confirmed by the position except the neutral position of the shifting position of the transmission. Thus, the apparatus of this invention is operated only when the occupant has effective starting or stopping intention. Therefore, the engine is not started even if the clutch pedal is depressed when the occupant has no intention of starting the engine, thereby preventing fuel loss of the engine, while when the occupant has no intention of stopping the engine, the depression of the clutch pedal is not removed, thereby causing no abrupt stop of the engine and no shock due to abrupt stop of the engine. Thus, the highly reliable apparatus can be provided according to the invention. It is noted that since the engine is not started at starting time when the clutch pedal is not fully depressed, the start of the engine in half-clutch engaged state can be prevented.

Figure 4:
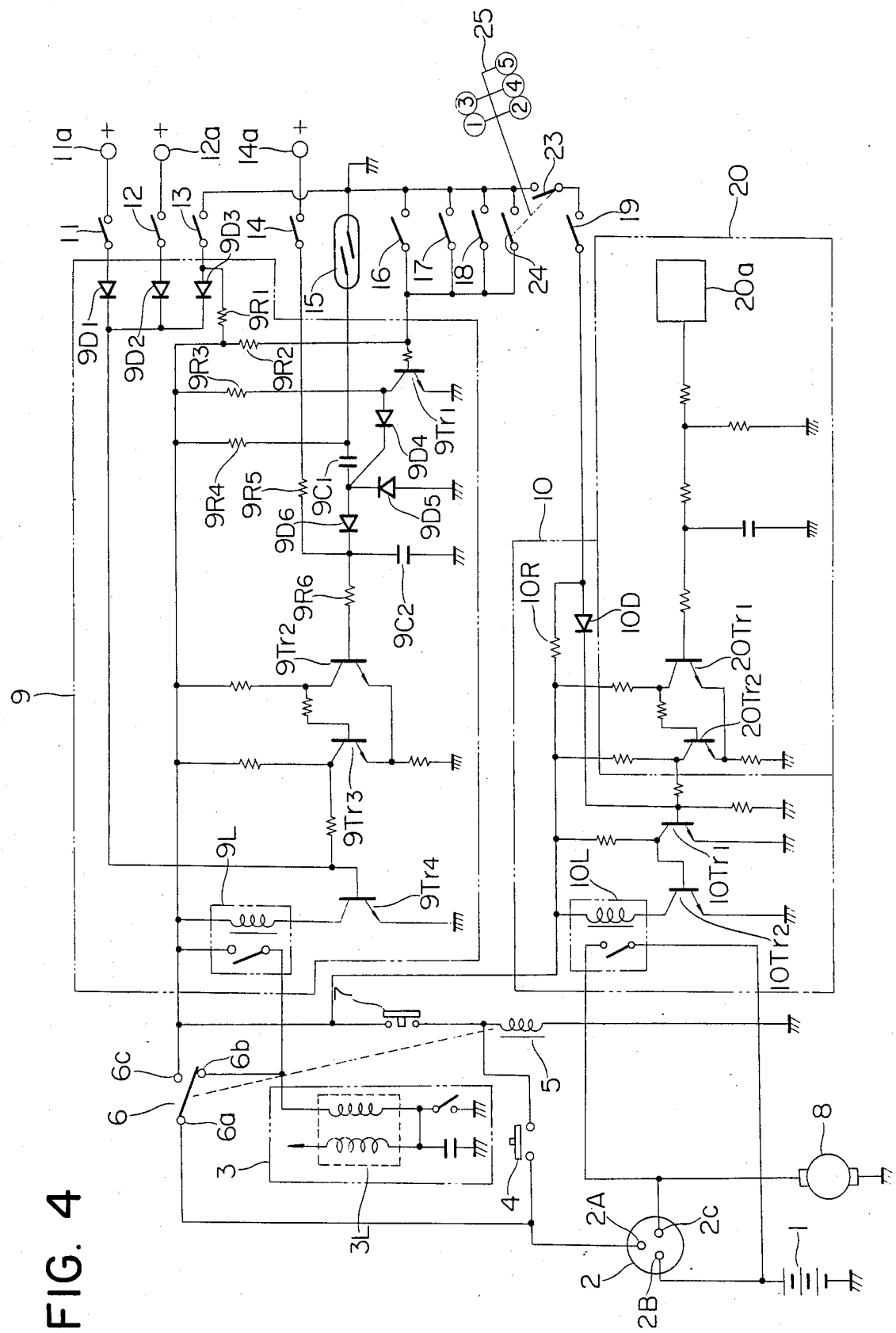
FIG. 4 is a circuit diagram of a second embodiment of the apparatus according to the invention.

A second embodiment of the present invention will be described with reference to FIG. 4. In the figure, numerals 23 and 24 designate neutral switches which interlock a the shift lever 25 of a transmission, the switch 23 closes when the shift lever is disposed at the positions except the neutral position and the switch 24 opens when the shift lever is disposed at the neutral position. Other elements are equivalent to those shown in FIG. 1, and the corresponding parts are denoted by the same symbols, and will not be explained repeatedly.

In the above-described apparatus, when a vehicle stops and the clutch pedal 22 is isolated from the foot 21, the first clutch switch 17 is opened, and when the transmission is shifted to the neutral position, the switch 24 is opened, and when the accelerator switch 16 and the slope switch 18 are opened, the transistor $9Tr_1$ is conducted. Further, when the turn signal switch 14 is opened, the voltage of the capacitor $9C_2$ is zero volt, and the transistor $9Tr_2$ is interrupted, while the transistor $9Tr_3$ is conducted. When the lighting switch 11 and the reverse switch 12 are opened and the water temperature sensor 13 is closed in this state, the output transistor $9Tr_4$ is interrupted, thereby deenergizing the ignition energization relay 9L to open its contacts and thus deenergizing the ignition circuit 3 of the engine to stop the engine.

On the other hand, when the clutch pedal 22 is fully depressed and the transmission is shifted to the position except the neutral position at the automatically starting time, the switches 23 and 24 are closed. When the switch 24 is closed, the base voltage of the transistor $9Tr_1$ becomes zero volt, thereby interrupting the transistor $9Tr_1$. In this manner, a charging current is flowed through the capacitor $9C_2$, resistor $9R_3$ and diode $9D_4$, $9D_6$ to charge the capacitor $9C_2$. Thus, the $9Tr_2$ is conducted, while the transistor $Tr_3$ is interrupted, and the transistor $9Tr_4$ is conducted, thereby energizing the relay 9L to close its contacts and thus supplying a current to the ignition circuit 3 from the battery as was described previously. Since the switches 19 and 23 are closed, the diode 10D is interrupted. Thus, the base current of the transistor $10Tr_1$ is bypassed to the earth through the diode 10D and the switches 19, 23. Accordingly, the transistor $10Tr_1$ is interrupted, while the transistor $10Tr_2$ is conducted, thereby energizing the relay 10L to close its contacts and thus energizing the starter 8 to automatically start the engine.

The above operations of the apparatus is summarized in Table 3 below.

TABLE 3

| Engine | T/M | Clutch | Vehicle speed |
| --- | --- | --- | --- |
| Stop | N | first clutch switch 17 OFF | 0 (stop) |
| Start | except N | second clutch | 0 (stop) |

TABLE 3-continued

| Engine | T/M | Clutch | Vehicle speed |
| --- | --- | --- | --- |
| | | switch 19 ON | |

Where T/M designates a transmission and N designates the neutral position. The vehicle speed is zero in both cases of automatic stop. In case of automatic stop, the conditions that the slope switch 18, turn signal switch 14, accelerator switch 16, lighting switch 11 and reverse switch 12 are opened and the water temperature sensor 13 is closed are added as described above, and these conditions also become the conditions of automatic start. The reverse to these conditions become the engine operation maintaining conditions.

As set forth above, according to this invention, the automatic stop of the engine has the conditions that the shifting position of the transmission is neutral and that the clutch pedal is not depressed, the automatic start of the engine has the conditions that the shifting position of the transmission is not neutral and that the clutch pedal is completely fully depressed. Thus, the occupant's stopping intention can be confirmed by the neutral position of the shifting position of the transmission, and the occupant's starting intention can be confirmed by the position except the neutral position of the shifting position of the transmission. Thus, the apparatus of this invention is operated only when the occupant has effective starting or stopping intention. Therefore, the engine is not started even if the clutch pedal is depressed when the occupant has no intention of starting the engine, thereby preventing fuel loss of the engine, while when the occupant has no intention of stopping the engine, the depression of the clutch pedal is not removed, thereby causing no abrupt stop of the engine and no shock due to abrupt stop of the engine. Thus, the highly reliable apparatus can be provided according to the invention. It is noted that since the engine is not started at starting time when the clutch pedal is not fully depressed, the start of the engine in half-clutch engaged state can be prevented.

Figure 5:
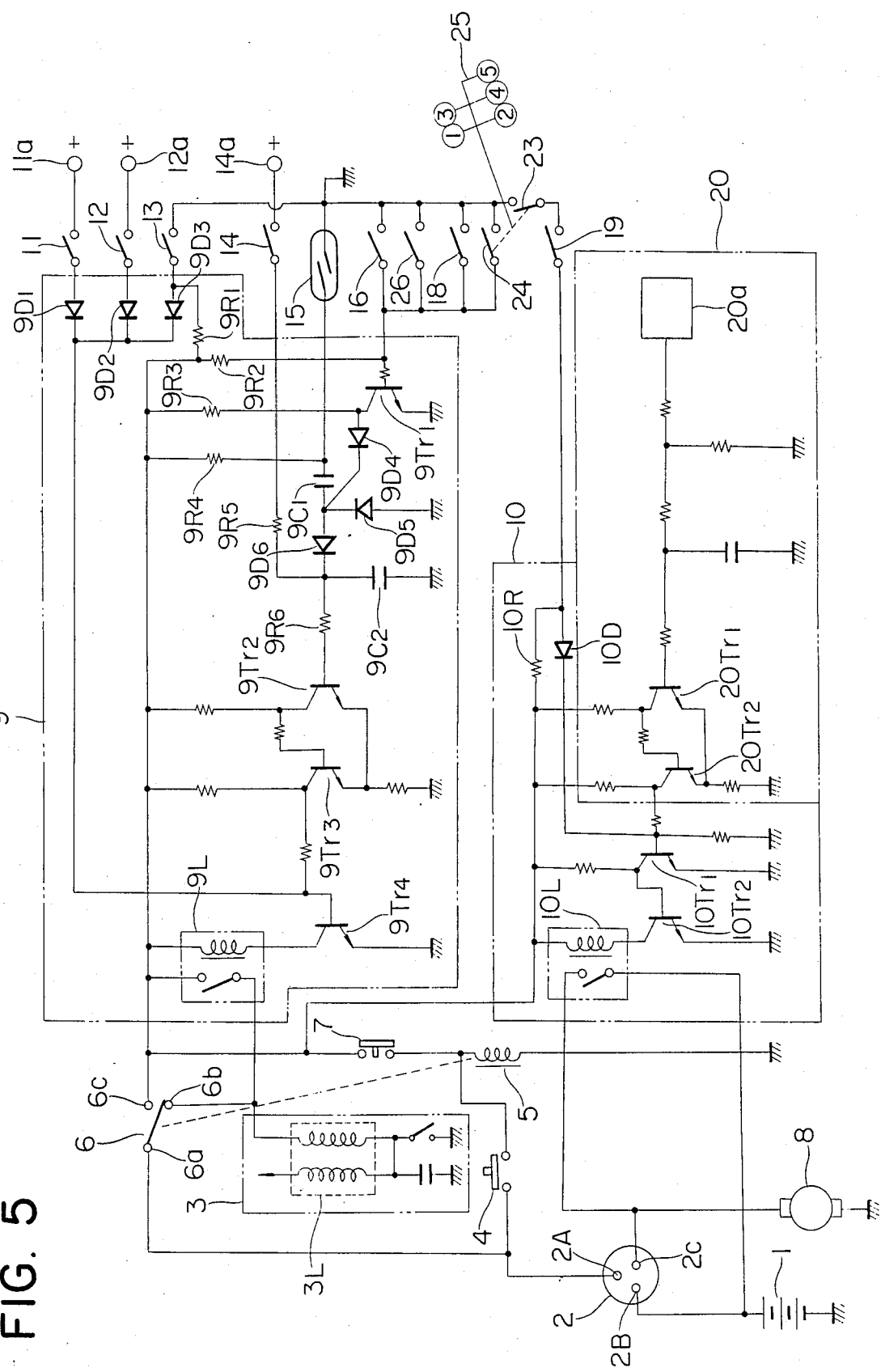
FIG. 5 is a circuit diagram of a third embodiment of the apparatus according to the invention.

A third embodiment of the present invention will now be described with reference to the accompanying drawings. In FIG. 5, numeral 26 designates a normally closed brake switch which opens when a brake pedal is depressed, and numerals 23 and 24 designate neutral switches which interlock the shift lever 25 of a transmission, and which open when the shift lever 25 is located at its neutral position. Other elements are equivalent to those shown in FIG. 1, and the corresponding parts are denoted by the same symbols, and will not be explained repeatedly.

In the above-described apparatus, since the brake pedal is depressed when a vehicle stops, the brake switch 26 is opened, and when the transmission is set to the neutral position, the neutral switches 23 and 24 open, and when the accelerator switch 16 and the slope switch 18 are opened, the transistor $9Tr_1$ is conducted. Further, when the turn signal switch 14 is opened, the voltage of the capacitor $9C_2$ is zero volt, and the transistor $9Tr_2$ is interrupted, while the transistor $9Tr_3$ is conducted. When the lighting switch 11 and the reverse switch 12 are opened and the water temperature sensor 13 is closed in this state, the output transistor $9Tr_4$ is interrupted, thereby deenergizing the ignition energization relay 9L to open its contacts and thus deenergizing the ignition circuit 3 of the engine to stop the engine.

On the other hand, when the clutch pedal 22 is fully depressed and the transmission is shifted to the position except the neutral position at the automatically starting time, the switches 19, 23 and 24 are closed. When the switch 24 is closed, the base voltage of the transistor 9Tr$_1$ becomes zero volt, thereby interrupting the transistor 9Tr$_1$. In this manner, a charging current is flowed through the capacitor 9C$_2$, resistor 9R$_3$ and diode 9D$_4$, 9D$_6$ to charge the capacitor 9C$_2$. Thus, the 9Tr$_2$ is conducted, while the transistor Tr$_3$ is interrupted, and the transistor 9Tr$_4$ is conducted, thereby energizing the relay 9L to close its contacts and thus supplying a current to the ignition circuit 3 from the battery as was described previously. Since the switches 19 and 23 are closed, the diode 10D is interrupted. Thus, the base current of the transistor 10Tr$_1$ is bypassed to the earth through the switches 19 and 23. Accordingly, the transistor 10Tr$_1$ is interrupted, while the transistor 10Tr$_2$ is conducted, thereby energizing the relay 10L to close its contacts and thus energizing the starter 8 to automatically start the engine.

The above operations of the apparatus is summarized in Table 4 below.

TABLE 4

| Engine | T/M | Clutch | Brake | Vehicle speed |
| --- | --- | --- | --- | --- |
| Stop | N | | Switch 26 OFF | 0 (stop) |
| Start | except N | clutch switch 19 ON | | 0 (stop) |

Where T/M designates a transmission and N designates the neutral position. The vehicle speed is zero in both cases of automatic stop and start and detected by the vehicle speed sensor 15. In case of automatic stop, the conditions that the slope switch 18, turn signal switch 14, accelerator switch 16, lighting switch 11 and reverse switch 12 are opened and the water temperature sensor 13 is closed are added as described above, and these conditions also become the conditions of automatic start. The reverse to these conditions become the engine operation maintaining conditions.

As set forth above, according to this invention, since the automatic stop of the engine has the conditions that the brake pedal is depressed and that the transmission is shifted to neutral position, the engine can be stopped even when vehicle is braked to stop in the state that the transmission is shifted to the neutral position without depression of the clutch pedal at the stopping time. Further, the automatic start of the engine is performed in the case that the clutch switch is fully depressed and that the transmission is shifted to the position except the neutral position, and accordingly the occupant's intention can be confirmed by the shifting position of the transmission, and the start of the starter of the engine in half-clutch engaged state can be prevented. Consequently, the reliability of thhe operation of the apparatus of the invention can be improved.

What is claimed is:

1. An apparatus for automatically starting and stopping an engine comprising:
   a clutch switch for detecting that the depression of a clutch pedal of a vehicle is completely performed,
   a neutral switch for detecting the neutral position of a transmission,
   a vehicle speed sensor for generating a travel signal by detecting the travel of the vehicle,
   condition detecting means for detecting the operation maintaining condition of the engine, and
   control means for automatically stopping the engine by interrupting the energization of an ignition circuit when receiving a detection signal of said neutral switch and not receiving the detection signals of said vehicle speed sensor and said condition detecting means and automatically starting the engine by energizing the ignition circuit and a starter when receiving a detection signal of said clutch switch and not receiving the detection signals of said neutral switch, said vehicle speed sensor and said condition detecting means.

2. An apparatus for automatically starting and stopping an engine comprising:
   a first clutch switch for detecting that a clutch pedal of a vehicle is depressed,
   a second clutch switch for detecting that the depression of a clutch pedal is completed,
   a neutral switch for detecting the neutral position of a transmission,
   a vehicle speed sensor for generating a travel signal by detecting the travel of the vehicle,
   condition detecting means for detecting the operation maintaining condition of the engine, and
   control means for automatically stopping the engine by interrupting the energization of an ignition circuit when receiving a detection signal of said neutral switch and not receiving the detection signals of said first clutch switch, said vehicle speed sensor and said condition detecting means and automatically starting the engine by energizing the ignition circuit and a starter when receiving a detection signal of said second clutch switch and not receiving the detection signals of said neutral switch, said vehicle speed sensor and said condition detecting means.

3. An apparatus for automatically starting and stopping an engine comprising:
   a clutch switch for detecting that the depression of a clutch pedal of a vehicle is completely performed,
   a neutral switch for detecting the neutral position of a transmission,
   a brake switch for detecting a brake operation,
   a vehicle speed sensor for generating a travel signal by detecting the travel of the vehicle,
   condition detecting means for detecting the operation maintaining condition of the engine, and
   control means for automatically stopping the engine by interrupting the energization of an ignition circuit when receiving detection signals of said neutral switch and said brake switch and not receiving the detection signals of said vehicle speed sensor and said condition detecting means and automatically starting the engine by energizing the ignition circuit and a starter when receiving a detection signal of said clutch switch and not receiving the detection signals of said neutral switch, said vehicle speed sensor and said condition detecting means.

* * * * *